United States Patent Office 3,535,256
Patented Oct. 20, 1970

3,535,256
LIGHT STABILIZERS FOR RIGID PVC
Mary Lou Siano, Marlboro Township, Monmouth County, and Matthew Peter Di Giaimo, Old Bridge, N.J., assignors to American Cyanamid Company, Stamford, Conn., a corporation of Maine
No Drawing. Continuation-in-part of application Ser. No. 386,386, July 30, 1964. This application Dec. 12, 1968, Ser. No. 783,415
Int. Cl. C08f 45/60
U.S. Cl. 260—45.75                        10 Claims

ABSTRACT OF THE DISCLOSURE

Polyvinyl chloride is made light stabilized by the addition of a 1,2-dibenzol-3-phenylguanidine. Optionally, heat stabilizers may be incorporated.

---

This application is a continuation-in-part of application Ser. No. 386,386 filed July 30, 1964, now abandoned.

This invention relates to the use of 1,2-diaroyl-3-arylguanidines as light stabilizers for polymeric materials. More particularly, it relates to the use of 1,2-dibenzoyl-3-phenylguanidines of Formula I in rigid (non-plasticized) poly(vinyl chloride).

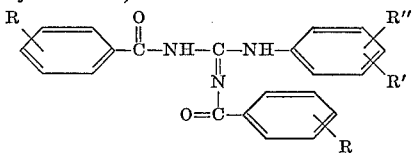

(I)

In Formula I, the R and R' symbols are individually either hydrogen, alkyl, cycloalkyl (5-6 carbons) aryl, hydroxy, alkoxy, or halogen; and R" is either R carboxymethyl, alkoxycarbonyl, alkanamido or carboxy.

The basic compound of Formula I, i.e. where all R's, R' and R'( are hydrogen, is disclosed in Beilstein, 12, 370.

For convenience, the term "poly(vinyl chloride)" will be referred to throughout the specification as "PVC." As used in this application, the expression "rigid PVC" is intended to mean a vinyl chloride polymeric composition having no significant amount of plasticizer. "Rigid PVC" is used in opposition to the expression "flexible PVC" which is PVC containing a significant amount of plasticizer.

The sensitivity to light and heat of both flexible and rigid PVC compositions has been recognized and, to some extent, dealt with, by incorporating in the polymeric compositions to be stabilized, effective amounts of light stabilizers and/or heat stabilizers. Recently, an advance was made by the use, in combination, of members of a specific class of heat stabilizers and members of a specific class of light stabilizers. Thus, in U.S. Pat. 2,912,411, there is disclosed a means of stabilizing PVC compositions by incorporation of a phosphorous amide (as a light stabilizer) in addition to a conventional heat stabilizer (e.g. sodium carbonate, cadmium ricinoleate or an organic epoxy hydrochlorophyl). While there is no definite statement by which the patent is expressly limited to the stabilization of flexible PVC, it is noted that in the examples of the patent, the PVC is in all cases plasticized (i.e., of the flexible type) with dioctyl phthalate. An attempt to stabilize rigid PVC in accordance with the patent teaching leads to discouraging results. Without any plasticizer, heat-stabilized rigid PVC responds only slightly to the stabilizing effect of the phosphorous triamide. Thus, rigid PVC (i.e., PVC without plasticizer) is made only a bit more light stable as compared with PVC having only the heat stabilizer alone. The increase in stability is only slight and hardly makes the addition of the extra component worth the expense. This can be seen from the following table.

TABLE I.—RIGID PVC

| Additive | | |
|---|---|---|
| Name | Conc., weight percent | U.V. exposure hours for $\Delta Y.I.=15$ |
| Control | | (²) |
| Organo-tin-mercaptide (Thermolite 31)¹ | 2 | 130 |
| Organo-tin mercaptide (Thermolite 31) | 2 | 185 |
| Hexamethylphosphoric triamide | 0.5 | |

¹ A commercially available di-n-butyl tin bis(iso-octyl mercapto acetate).
² Degrades on mill.

This light stabilizer, found to be very useful for flexible PVC, is per se of only questionable use in rigid PVC. In view of this finding, it is an object of the present invention to provide a light stabilizer which is capable of increasing the stability of rigid PVC either alone or in the presence of a heat stabilizer. It is a further object to provide the stabilized rigid PVC composition obtained by using the stabilizer of this invention.

These and other objects are accomplished herein with great effectiveness in a surprisingly simple manner. In accordance with the present invention, rigid PVC, whether or not it contains a conventional heat stabilizer, is made stable to light by addition thereto of a compound of Formula I. The amount of 1,2-dibenzoyl-3-phenylguanidine used should be between 0.1% and 2.0%, preferably between 0.2% and 1.0% based on the weight of the PVC.

It should be noted that the invention contemplates the stabilization of PVC against light degradation encountered during normal usage of articles manufactured from PVC. In the preferred form, the invention also contemplates stabilization of PVC against both light and heat degradation.

The heat stabilizer which is preferably used in the PVC for the latter to be processible at high temperatures, can be any conventionally available types. While rigid PVC is always processed commercially in the presence of a heat stabilizer and the same types are useful herein in normally effective amounts, use of such heat stabilizers are not necessary to obtain the benefits of this invention. Most heat stabilizers are organo-metallic compounds. However, inorganic compounds such as sodium carbonate are also useful. Among the heat stabilizing organo-metallic compounds are the organo-tin compounds, dibutyl tin dimaleate, dibutyl tin dilaurate, dibutyl tin thioglycolic acid octyl ester, di-n-butyl tin bis (isooctyl mercapto acetate); the cadmium or barium salts (barium stearate, cadmium stearate, barium ricinoleate, cadmium ricinoleate, barium octylphenolate); and the organic hydrochlorophyl (acid acceptor) of the epoxy type (epoxidized soybean oil, methyl epoxystearates). A more complete listing of such heat stabilizers is disclosed in Chevassus et al., The Stabilization of Polyvinyl Chloride, Arnold Publ. Ltd., London (1963), pp. 343-374.

The guanidines of Formula I can be prepared by reacting a 1,3-dibenzoyl-2-alkylisothiourea (II) with an aromatic amine (III).

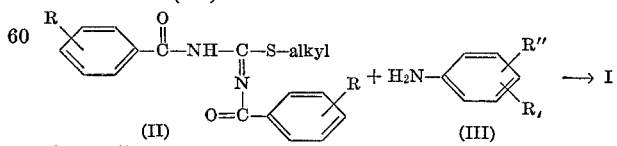

Generally because of ease of availability of starting materials, it is preferable to prepare guanidines of Formula I wherein alkyl and alkoxy groups have no more than 18, and preferably less than 8 carbons, cycloalkyl groups have 5–6 carbons, and aryl groups have only one six-membered carbocyclic ring which may have simple substituents such as lower alkyl or alkoxy, halo, lower alkanamido, etc.

1,3-dibenzoyl-2-alkylisothiourea (II) which may be used in preparing the guanidines of Formula I include 1,3-dibenzoyl-2-methylisothiourea,
1,3-dibenzoyl-2-ethylisothiourea,
1,3-bis(4-chlorobenzoyl)-2-ethylisothiourea,
1,3-bis(4-fluorobenzoyl)-2-ethylisothiourea,
1,3-bis(4-methoxybenzoyl)-2-ethylisothiourea,
1,3-bis(4-ethoxybenzoyl)-2-ethylisothiourea,
1,3-bis(4-n-propoxybenzoyl)-2-ethylisothiourea,
1,3-bis(4-n-butoxybenzoyl)-2-ethylisothiourea,
1,3-di-o-toluoyl-2-ethylisothiourea,
1,3-di-p-toluoyl-2-n-propylisothiourea,
1,3-di-m-toluoyl-2-methylisothiourea,
1,3-bis(4-ethylbenzoyl)-2-ethylisothiourea,
1,3-bis(2-ethylbenzoyl)-2-ethylisothiourea,
1,3-bis(4-n-propylbenzoyl)-2-methylisothiourea,
1,3-bis(4-cyclohexylbenzoyl)-2-ethylisothiourea,
1,3-bis(4-phenylbenzoyl)-2-ethylisothiourea,
1,3-disalicyloyl-2-ethylisothiourea, etc.

The 1,3-dibenzoyl-2-alkylisothioureas (II) may be prepared by reacting an S-alkylisothiourea with benzoyl chloride or a substituted benzoyl chloride according to the process of German Pat. 456,098.

Representative aromatic amines (III) which may be used in preparing the guanidines of Formula I include aniline o-anisidine, m-anisidine, p-anisidine, p-chloroaniline, o-chloroaniline, m-chloroaniline, p-bromoaniline, m-fluoroaniline, 2,4-dimethoxyaniline p-acetamidoaniline, p-ethoxy-carbonylaniline, o-aminophenol and p-aminophenol, p-toluidine, o-toluidine, p-ethylaniline, p-cyclohexylaniline, o-aminobenzoic acid, p-aminophenylacetic acid, 2,5-dichloroaniline, 3,4-dichloroaniline, 2-chloro-5-methylaniline, 5-chloro-2-methylaniline, 2,5-dimethylaniline, 2-methyl-5-tertiarybutylaniline, 4-amino-2-hydroxybenzoic acid, etc.

The 1,2-dibenzoyl-3-phenylguanidines of Formula I which may be employed in the practice of this invention include, among others, 1,2-dibenzoyl-3-phenylguanidine,
1,2-dibenzoyl-3-(2-methoxyphenyl)guanidine,
1,2-dibenzoyl-3-(4-methoxyphenyl)guanidine,
1,2-dibenzoyl-3-(3-methoxyphenyl)guanidine,
1,2-dibenzoyl-3-(4-chlorophenyl)guanidine,
1,2-dibenzoyl-3-(2-chlorophenyl)guanidine,
1,2-dibenzoyl-3-(3-chlorophenyl)guanidine,
1,2-dibenzoyl-3-(p-tolyl)guanidine,
1,2-dibenzoyl-3-(2,5-dichlorophenyl)guanidine,
1,2-bis(4-methoxybenzoyl)-3-(p-methoxyphenyl)guanidine,
1,2-dibenzoyl-3-(2,4-dimethoxyphenyl)guanidine,
1,2-dibenzoyl-3-(p-n-butylphenyl)guanidine,
1,2-bis(4-methoxybenzoyl)-3-(p-chlorophenyl)guanidine,
1,2-dibenzoyl-3-(p-hydroxyphenyl)guanidine,
1,2-dibenzoyl-3-(p-ethoxycarbonylphenyl)guanidine,
1,2-dibenzoyl-3-(p-acetamidophenyl)guanidine,
1,2-dibenzoyl-3-(3,4-dichlorophenyl)guanidine,
1,2-dibenzoyl-3-(2-methyl-5-tertiary-butylphenyl)guanidine,
1,2-dibenzoyl-3-(2-methyl-5-chlorophenyl)guanidine,
1,2-dibenzoyl-3-(o-carboxyphenyl)-guanidine,
1,2-dibenzoyl-3-(4-carboxy-3-hydroxyphenyl)-guanidine,
1,2-dibenzoyl-3-(4-[carboxymethyl]phenyl)guanidine,
1,2-bis(4-chlorobenzoyl)-3-phenylguanidine,
1,2-bis(2-ethylbenzoyl)-3-phenylguanidine,
1,2-bis(4-methoxybenzoyl)-3-phenylguanidine,
1,2-bis(4-cyclohexylbenzoyl)-3-p-tolyl-guanidine,
1,2-bis(4-phenylbenzoyl)-3-phenylguanidine, etc.

When used with a heat stabilizer, the light stabilizer of the present invention is added to the rigid PVC generally after the heat stabilizer is incorporated. Blending is accomplished by conventional milling procedures. After thorough blending, the PVC can then be shaped into a film or other article of manufacture by compression-molding, extrusion, injection-molding, calendering, etc.

Other additives may be employed to modify the rigid PVC for the intended application. Among such additives are fillers, antistatic agents, lubricants, pigments, dyes, etc.

The following examples, in which parts and percentages are on the basis of weight, are presented to further illustrate the present invention.

EXAMPLE 1

A series of films of 50 mil. thickness was prepared from PVC composition containing (1) 0.5% of an additive of Formula I as shown below in Table II and (2) a heat stabilizing amount of a commercial organo-tin-mercaptide (Thermolite 31) heat stabilizer. A film was also made from PVC having no additive of Formula I present. The PVC used in this Example contained no plasticizer.

The films were exposed to ultraviolet light using a Fluorescent Sunlamp-Blacklight (FS-BL) lamp, continuing the exposure until a given increase in yellow color was attained. The increase in yellow color is defined as a change or increase in the Yellow Index (Y.I.) of 15 units. The Yellow Index is determined on a differential colorimeter ("Colormaster") using the following formula (see Example 8, U.S. Pat. 3,079,366):

$$\text{Yellow Index} = 70\left(1.0 - \frac{\text{Blue}}{\text{Green}}\right)$$

The results are shown below in Table II.

TABLE II

| No. | Guanidine Additive | | | | FS-BL exposure (hours) to ΔY.I. of 15 |
|---|---|---|---|---|---|
| | R | R | R" | R' | |
| 1 | H | H | o-CH₃ | H | 370 |
| 2 | H | H | p-CH₃ | H | 480 |
| 3 | H | H | m-OCH₃ | H | 460 |
| 4 | H | H | p-OCH₃ | H | 520 |
| 5 | H | H | o-Cl | H | 430 |
| 6 | H | H | m-Cl | H | 380 |
| 7 | H | H | p-Cl | H | 500 |
| 8 | H | H | o-COOH | H | 230 |
| 9 | H | H | p-CH₂COOH | H | 370 |
| 10 | H | H | 2-CH₃ | H | 420 |
| 11 | H | H | 2-CH₃ | 5-CH(CH₃)₃ | 420 |
| 12 | H | H | 2-CH₃ | 5-Cl | 380 |
| 13 | H | H | 2-Cl | 5-Cl | 420 |
| 14 | H | H | 3-Cl | 4-Cl | 420 |
| 15 | H | H | 4-COOH | 3-OH | 380 |
| 16 | p-Cl | p-Cl | H | H | 450 |
| 17 | p-OCH₃ | o-OCH₃ | p-OCH₃ | H | 660 |
| 18 | H | H | 2-OCH₃ | 4-OCH₃ | 590 |
| 19 | H | H | p-C₄H₉(n) | H | 480 |
| 20 | p-OCH₃ | p-OCH₃ | p-Cl | H | 540 |
| 21 | H | H | p-OH | H | 390 |
| 22 | p-OCH₃ | p-OCH₃ | H | H | 410 |
| 23 | H | H | o-OH | H | 460 |
| 24 | H | H | p-OCOC₂H₅ | H | 330 |
| 25 | H | H | H | H | 250 |
| 26 | | | No additive | | 151 |

EXAMPLE 2

Employing the procedure of Example 1, two additives of Formula I were tested in PVC against the same control for effectiveness at a 0.1% concentration with the following results.

TABLE III

| No. | Guanidine additive | | | | FS-BL exposure (hours) to Δ Y.I. of 15 |
|---|---|---|---|---|---|
| | R | R | R'' | R' | |
| 1 | H | H | p-NHCOCH₃ | H | 300 |
| 2 | p-OC₂H₅ | p-OC₂H₅ | H | H | 230 |

EXAMPLE 3

Two PVC films were prepared without any heat stabilizer present. One film contained 1.0% of 1,2-di-(4-methoxybenzoyl)-3-(4-methoxyphenyl)guanidine as the light stabilizer while the other control film had no additive. Each film was compression molded directly from the homopolymer powder (after dry blending one portion of the PVC homopolymer with the guanidine light stabilizer for the treated film). The two films were then exposed to ultraviolet light using a Fluorescent Sunlamp-Blacklight (FS-BL) lamp for 75 hours and the change in yellow index was measured using a differential colorimeter ("Colormaster"), as in Example 1. The results are shown below in Table IV.

TABLE IV

| Sample description | Initial Y.I. | Δ Y.I. on exposure for 75 hours |
|---|---|---|
| PVC control—no additive | 4.1 | 30.4 |
| PVC+1.0% light stabilizer | 4.7 | 1.7 |

These examples clearly demonstrate the beneficial light stabilizing effect of the 1,2-dibenzoyl-3-phenylguanidines in rigid PVC in accordance with the present invention in the presence of and in the absence of heat stabilizers.

We claim:

1. Rigid poly(vinyl chloride) stabilized against the deteriorating effects of light by having incorporated therein an effective amount of a stabilizer of the formula:

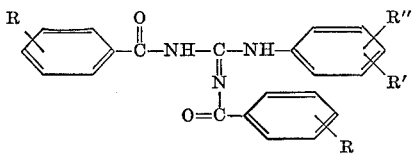

wherein R and R' are individually selected from the group consisting of hydrogen, alkyl of up to 18 carbons, cycloalkyl of 5–6 carbons, monocyclic aryl, hydroxy, alkoxy of up to 18 carbons and halogen; and R'' is selected from the group consisting of R, carboxymethyl, lower alkoxycarbonyl lower alkanamido and carboxy.

2. Rigid poly(vinyl chloride) stabilized against the deteriorating effects of light by having incorporated therein in a concentration of 0.1 to 2.0%, 1,2-dibenzoyl-3-(p-methoxyphenyl)guanidine.

3. Rigid poly(vinyl chloride) stabilized against the deteriorating effects of light by having incorporated therein in a concentration of 0.1 to 2.0%, 1,2-dibenzoyl-3-(p-chlorophenyl)guanidine.

4. Rigid poly(vinyl chloride) stabilized against the deteriorating effects of light by having incorporated therein in a concentraton of 0.1 to 2.0%, 1,2-di(p-methoxybenzoyl)-3-(p-methoxyphenyl)guanidine.

5. Rigid poly(vinyl chloride) stabilized against the deteriorating effects of light by having incorporated therein a concentration of 0.1 to 2.0%, 1,2-dibenzoyl-3-(2,4-dimethoxyphenyl)guanidine.

6. Rigid poly(vinyl chloride) stabilized against the deteriorating effects of light by having incorporated therein in a concentration of 0.1 to 2.0%, 1,2-di(p-methoxybenzoyl)-3-(p-chlorophenyl)guanidine.

7. A rigid poly(vinyl chloride) composition in accordance with claim 1 having an effective amount of heat stabilizer.

8. The composition of claim 7 wherein the heat stabilizer is an organo-metallic compound.

9. The composition of claim 7 wherein the heat stabilizer is an organo-tin compound.

10. Rigid poly(vinyl chloride) stabilized against the deteriorating effects of light by having incorporated therein an effective amount of a stabilizer of the formula:

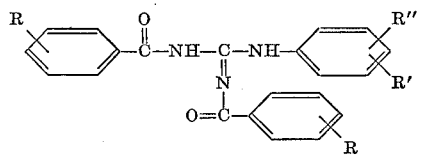

wherein R and R' are individually selected from the group consisting of hydrogen, alkyl of up to 18 carbons, cycloalkyl of 5–6 carbons, monocyclic aryl, hydroxy, alkoxy of up to 18 carbons and halogen; and R'' is selected from the group consisting of R, carboxymethyl, lower alkoxycarbonyl, lower alkanamido and carboxy; and an effective amount of the heat stabilizing compound dibutyl bis (tin thioglycolic acid octyl ester).

References Cited

UNITED STATES PATENTS

| 2,641,588 | 6/1953 | Leistner | 260—45.75 |
| 3,084,135 | 4/1963 | Scullin | 260—45.9 |

DONALD E. CZAJA, Primary Examiner

V. P. HOKE, Assistant Examiner

U.S. Cl. X.R.

260—23, 45.7, 45.8, 45.85, 45.9, 45.95

UNITED STATES PATENT OFFICE
CERTIFICATE OF CORRECTION

Patent No. 3,535,256        Dated Oct. 20, 1970

Inventor(s) Mary Lou Siano and Matthew Peter DiGiaimo

It is certified that error appears in the above-identified patent and that said Letters Patent are hereby corrected as shown below:

Column 1, line 14, "-dibenzol-" should read -- -dibenzoyl- --; line 36, "$R^1$ and $R^{1"}$" should read --$R^1$ and $R"$--. Column 4, Table II, No. 10, in the $R^1$ column, "H" should be --5-$CH_3$--; No. 17, in the second R column, "0-$OCH_3$" should be --p-$OCH_3$--; No. 20, the "-----" between the two R columns should be deleted. Column 5, line 3, "control" should read --control sample--.

SIGNED AND
SEALED

FEB 23 1971

(SEAL)
Attest:

Edward M. Fletcher, Jr.
Attesting Officer

WILLIAM E. SCHUYLER, JR.
Commissioner of Patents